(12) United States Patent
Wyatt (10) Patent No.: US 9,092,499 B2
(45) Date of Patent: Jul. 28, 2015

(54) SYNCHRONIZING ENDPOINT DATA STORES HAVING DISPARATE SCHEMAS

(75) Inventor: Derek Quinn Wyatt, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 91 days.

(21) Appl. No.: 13/354,493

(22) Filed: Jan. 20, 2012

(65) Prior Publication Data

US 2013/0191332 A1 Jul. 25, 2013

(51) Int. Cl.
*G06F 17/30* (2006.01)

(52) U.S. Cl.
CPC ................................. *G06F 17/30578* (2013.01)

(58) Field of Classification Search
CPC .............................................. G06F 17/30578
USPC ........................................................ 707/610
See application file for complete search history.

(56) References Cited

U.S. PATENT DOCUMENTS

| | | | |
|---|---|---|---|
| 5,684,990 A | 11/1997 | Boothby | |
| 5,706,509 A | 1/1998 | Tso | |
| 5,809,494 A | 9/1998 | Nguyen | |
| 6,457,062 B1 | 9/2002 | Pivowar et al. | |
| 6,470,329 B1 | 10/2002 | Livschitz | |
| 6,553,037 B1 | 4/2003 | Pivowar et al. | |
| 6,820,088 B1 | 11/2004 | Hind et al. | |
| 7,062,704 B2 | 6/2006 | Talagala et al. | |
| 7,133,963 B2 | 11/2006 | Gilfix et al. | |
| 7,317,907 B2 | 1/2008 | Linkert et al. | |
| 7,457,631 B2 | 11/2008 | Yach et al. | |
| 7,478,118 B2 | 1/2009 | Tysowski et al. | |
| 7,490,114 B2 | 2/2009 | Hind et al. | |
| 7,509,350 B2 | 3/2009 | Linkert et al. | |
| 7,613,739 B2 | 11/2009 | Tysowski et al. | |
| 7,747,566 B2 | 6/2010 | Tysowski et al. | |
| 7,840,528 B2 | 11/2010 | Agrawal et al. | |
| 8,019,722 B2 | 9/2011 | Linkert et al. | |
| 2001/0044805 A1 | 11/2001 | Multer et al. | |
| 2002/0029214 A1 | 3/2002 | Yianilos et al. | |
| 2002/0116404 A1 | 8/2002 | Cha et al. | |
| 2002/0120648 A1 | 8/2002 | Ball et al. | |
| 2004/0083263 A1* | 4/2004 | Richardson et al. | 709/204 |
| 2008/0162581 A1 | 7/2008 | Long | |
| 2009/0083441 A1* | 3/2009 | Clark et al. | 709/248 |
| 2009/0132606 A1 | 5/2009 | Cha et al. | |

OTHER PUBLICATIONS

Dinesh Dhamija "Synchronization of Information in Multiple Heterogeneous Manufacturing Databases", Mar. 1999, pp. 1-255.
European Patent Office, European Search Report of Appl. 13151445.7 dated Jul. 12, 2013 (10 pages).
Canadian Intellectual Property Office, Office Action for Canadian Appl. No. 2,802,458 dated Nov. 24, 2014 (3 pages).

* cited by examiner

*Primary Examiner* — Huawen Peng
(74) *Attorney, Agent, or Firm* — Trop Pruner & Hu, P.C.

(57) ABSTRACT

Synchronizing data between multiple endpoint data stores that have disparate schemas is accomplished in a manner that reduces complexity. Each endpoint data store has an associated local schema that orders data into one or more fields. A synchronization server is disposed between the endpoints and keeps the multiple endpoints synchronized without the endpoints having to understand the various local schemas. A virtual schema is generated based on a set-intersection of the local schemas. The virtual schema maps a field in one local schema to a field in another local schema. Data is synchronized between the endpoint data stores using the virtual schema.

23 Claims, 6 Drawing Sheets

SYNCHRONIZING ENDPOINT DATA STORES HAVING DISPARATE SCHEMAS

FIELD OF TECHNOLOGY

The present disclosure relates to a system and method for synchronizing data between endpoint data stores having disparate schemas.

BACKGROUND

Communication networks of many varied types have been developed and deployed to provide for the communication of data. Communication networks can provide for communication by way of wired connection with communication stations, and other communication networks provide for communication by way of radio connections. Interconnectivity between networks provides for communication between communications stations connected to different communication networks.

For many, access to mobile and other radio communication systems is a necessary aspect of daily life. Cellular, and other analogous, radio communication systems, for instance, have been installed that encompass significant portions of the populated areas of the world. Communications are typically carried out in such systems through use of a portable wireless device that includes transceiver circuitry, which permits communication with the network of the communication system.

While portable wireless devices were first generally constructed primarily to provide voice communication services and provided only limited other functionalities, portable wireless devices often times are now constructed to provide application and data-intensive data communication services. Email, or other messaging, services are exemplary of a data communication service. Such messaging, as well as other data, services often times utilize a data store or database at which data is stored, available for subsequent retrieval.

Other devices, including devices that do not include radio transceiver circuitry, also provide for data storage and processing functionalities in which data stores or databases are created or otherwise utilized or manipulated with various applications.

Several types of portable wireless devices, for instance, are capable of storing and manipulating database data. Howsoever implemented, the data stored at a database of a device is formatted according to a formatting schema, typically a scheme in which a series of data records or entries are defined in which each data record or entry contains one or more data fields.

While conventional mechanisms are available by which to synchronize data stores, operational constraints inherent in the synchronization mechanism sometimes cause synchronization to be carried out in a less than ideal manner. For instance, data relating to similar applications or purposes can be stored in data stores that have different schemas. Synchronization of such data, among multiple data stores, would be difficult or face challenges without an intermediating mechanism that could correlate data among the multiple data stores and translate between the different schemas.

Various challenges, therefore, remain, with respect to synchronization of data stores, particularly those having disparate schemas. It is in light of this background information that significant advances of the present disclosure have evolved.

BRIEF DESCRIPTION OF THE DRAWINGS

A more complete understanding of the embodiments of the present patent disclosure may be had by reference to the following description and claims when taken in conjunction with the accompanying drawings in which:

DETAILED DESCRIPTION

The present disclosure provides a system and method for synchronizing data between two or more endpoint data stores where the data stores have different schemas.

Figure 1:
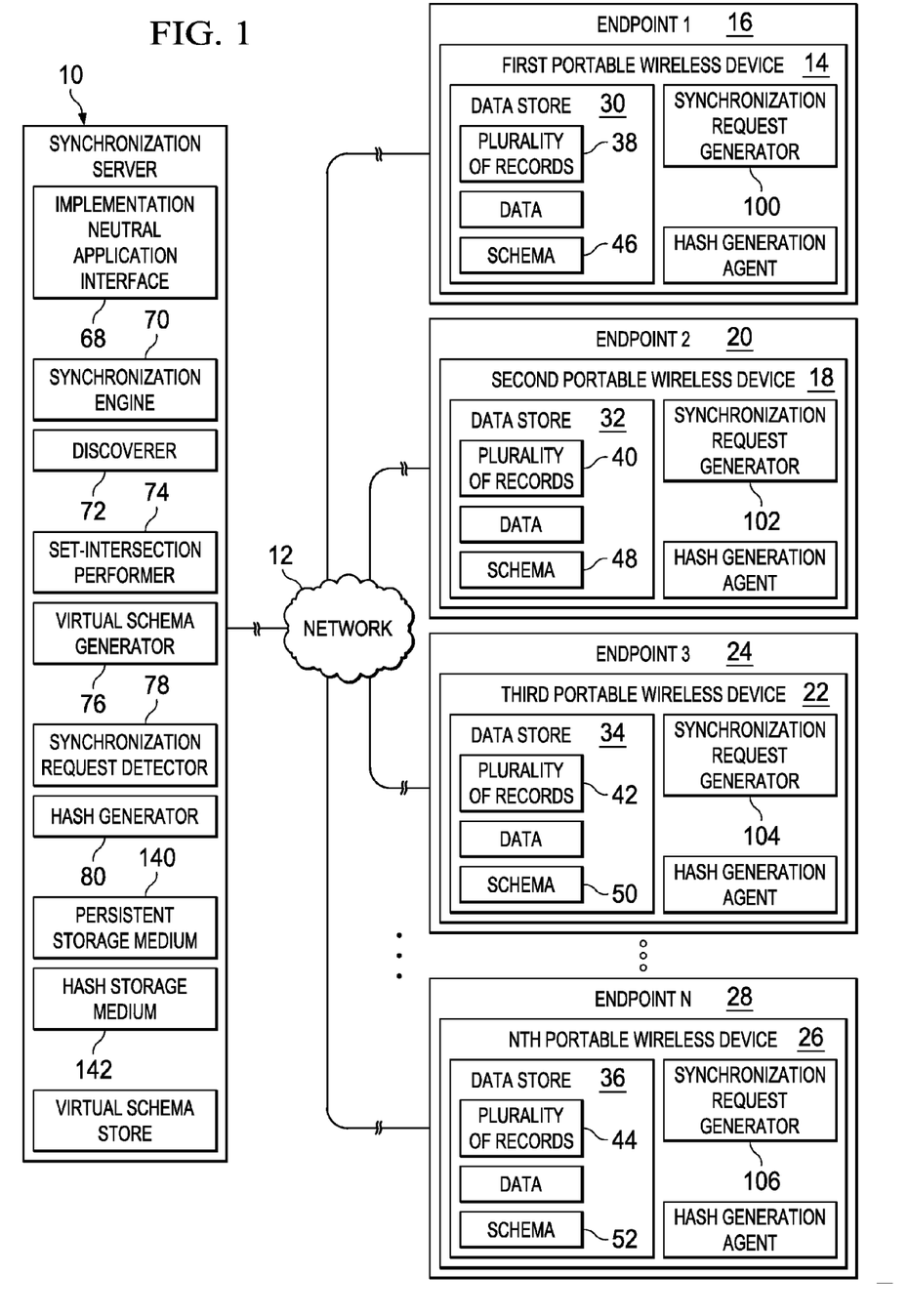
FIG. 1 depicts a synchronization server communicatively coupled to a plurality of endpoints.

Referring to FIG. 1, in an exemplary embodiment according to the principles of the invention, a synchronization server 10 is communicatively coupled through a network 12 to a plurality of portable wireless devices at respective endpoints. In the example shown, a first portable wireless device 14 at a first endpoint 16, a second portable wireless device 18 at a second endpoint 20, a third portable wireless device 22 at a third endpoint 24, and an N$^{th}$ portable wireless device 26 at an N$^{th}$ endpoint 28 are communicatively coupled through the network 12 to the synchronization server 10.

The synchronization server can be deployed or employed in accordance with the principles of the invention within a variety of environments and infrastructures, including, by way of example and not limitation, communication systems, such as, e.g., radio or mobile communication systems, or computing systems, such as, e.g., cloud computing or provisioning systems.

The network 12 can support wired communication, wireless communication, or a combination thereof. For example, the network 12 can be a TCP/IP network, such as the Internet, or an RF network, which can include a plurality of radio towers, base station electronics, control centers, etc., for communicating RF messages to and from portable wireless devices, or a combination thereof.

As used herein, the phrase "portable wireless device" encompasses, by way of example and not limitation, an apparatus such as a cellular telephone, a smartphone, a portable computer, a portable electronic gaming device, a mobile station ("MS"), a mobile device, a terminal, a cellular handset, a personal digital assistant ("PDA"), a handheld computer, a desktop computer, a laptop computer, a tablet computer, a set-top box, a television, a wireless appliance, or some other similar technology. A portable wireless device may contain one or more RF transmitters and receivers, and one or more antennas to communicate with a base station. Further, a portable wireless device may be mobile and may have the ability to move through a wireless communication network. For LTE and LTE-A equipment, the portable wireless device is also referred to as user equipment ("UE").

As used herein, an endpoint is a computing or processing entity with which the synchronization server can interact. For example, a particular tablet computer (or even more specifically, a particular data set within that tablet computer) may be an endpoint if it has software on it that provides a communication mechanism for communicating with the synchronization server. As another example, a piece of middleware software on a database server that proxies the communication between the synchronization server and the database server may function as an endpoint with respect to the synchronization server.

Each of the plurality of portable wireless devices at its respective endpoint comprises a data store 30, 32, 34, 36. As used herein, a data store is not limited to being a database. Rather, a data store can be any piece of data of any format anywhere accessible by a computing or processing device. For example, the data store could be a register in a CPU or a variable in volatile RAM. Each data store includes a plurality of records 38, 40, 42, 44 ordered and arranged according to a local schema 46, 48, 50, 52. The term "schema" refers to, by way of example but not limitation, a scheme or data structure in which a series of data records or entries are defined in which each data record or entry contains one or more data fields, and encompasses the way the data is organized or labeled. Each local schema at a respective endpoint defines a structure or pattern in which the data is stored, organized and/or labeled.

According to a specific example, the data at each endpoint data store are content-related (i.e., the data may relate to the same or similar application or function, but are not necessarily related to the same application) but have differing schemas. For example, the first data store 30 at the first endpoint 16 and the second data store 32 at the second endpoint 20 may have GPS data in them and, while the type of data itself may be the same between the two (e.g., latitude and longitude fields) they may not have the same names for the fields.

Figure 2:
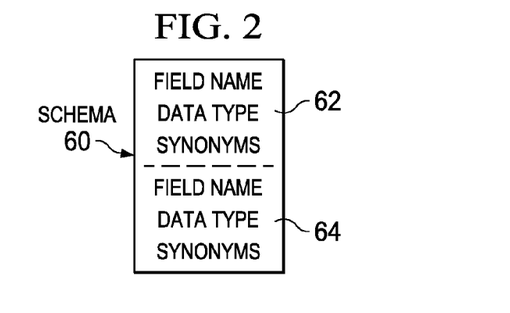
FIG. 2 depicts a schema which includes multiple pairs of field names and data types along with synonyms for the field names.

An example of the content of a schema, such as the first local schema 46 at the first endpoint 16, is described with respect to FIG. 2. The example schema 60 depicted in FIG. 2 is structured to include multiple pairs 62, 64 of associated field names and data types along with synonyms for the field names.

Figure 3:
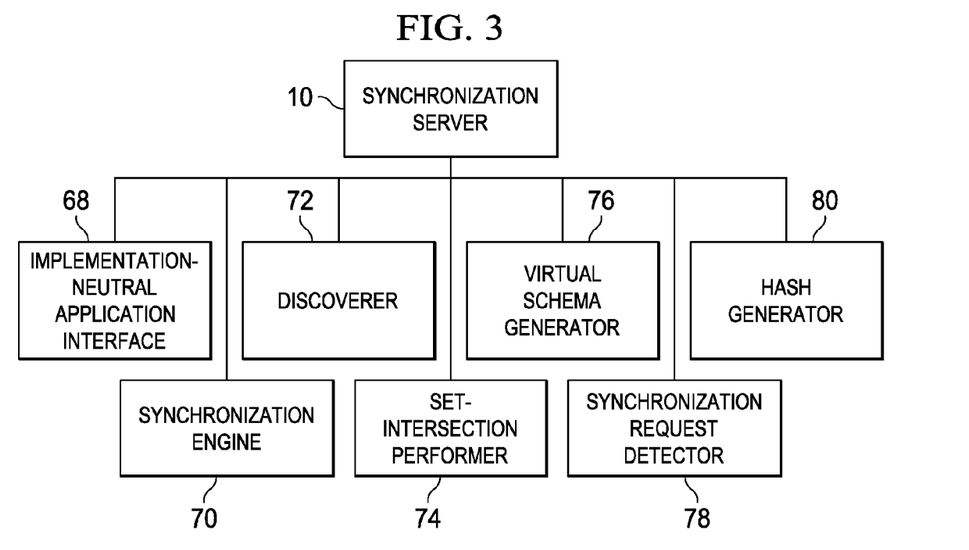
FIG. 3 depicts a synchronization server composed of a plurality of modules.

The synchronization server 10 shown in FIG. 1 includes a plurality of computing and/or processing modules that cooperate and work together to implement the functions and operation of the system and method. FIG. 3 is a block diagram of modules of the synchronization server 10.

Referring to FIG. 3, by way of example and not limitation, a specific embodiment of the synchronization server 10 is composed of a plurality of modules, which in this example include: an implementation-neutral application interface (API) module 68, a synchronization engine 70, a discoverer 72, a set-intersection performer 74, a virtual schema generator 76, a synchronization request detector 78, and a hash generator 80. Other embodiments may be composed of different and/or additional modules in accordance with the principles of the invention.

The synchronization engine 70 fronts the implementation-neutral API module 68 to the plurality of portable wireless devices 14, 18, 22, 26 deployed at respective endpoints 16, 20, 24, 28. The discoverer module 72 fetches or retrieves local schemas from the portable wireless devices at the endpoints. The set-intersection performer module 74 performs set-intersection on retrieved local schemas. As used herein, set-intersection is equivalent to the mathematical concept with the same name. Given two sets of data, the intersection of those sets results in a new set containing fields that are equivalent in both of the original sets. The virtual schema generator 76 generates a virtual schema based on the set intersection of such retrieved local schemas. The synchronization request detector 78 recognizes a synchronization request as a triggering event. The hash generator 80 is operable to perform hash functions at the endpoints and the server upon endpoint and server copies of database information. The hash generator 80 is further operable to calculate a hash value based on endpoint-side data and server-side data or based on other hash values. A group of records can be represented by a hash value of a content of the records. Comparison of the hash information formed therefrom can provide an indication of whether databases are in match.

Figure 4:
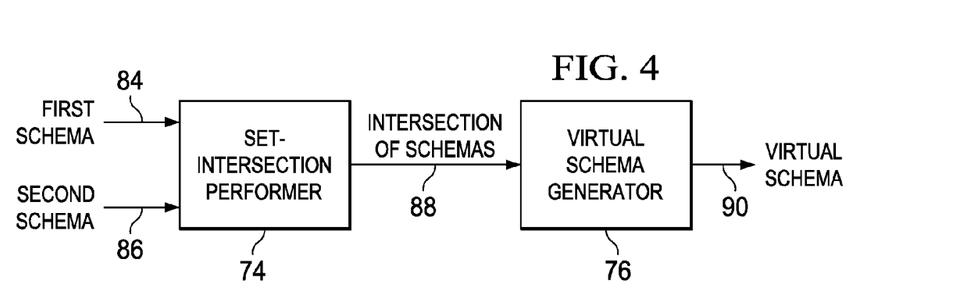
FIG. 4 depicts cooperative interaction between a virtual schema generator and a set-intersection performer.

An example of the cooperative interaction between the virtual schema generator 76 and the set-intersection performer 74 is illustrated in FIG. 4. As shown in FIG. 4, the set-intersection performer 74 performs a set-intersection on the respective schemas 84, 86 that have been retrieved from the respective endpoints so as to calculate an intersection 88 of the field names and data types defined by the schemas. The virtual schema generator 76 generates a virtual schema 90 based on the intersection of the schemas.

Figure 5:
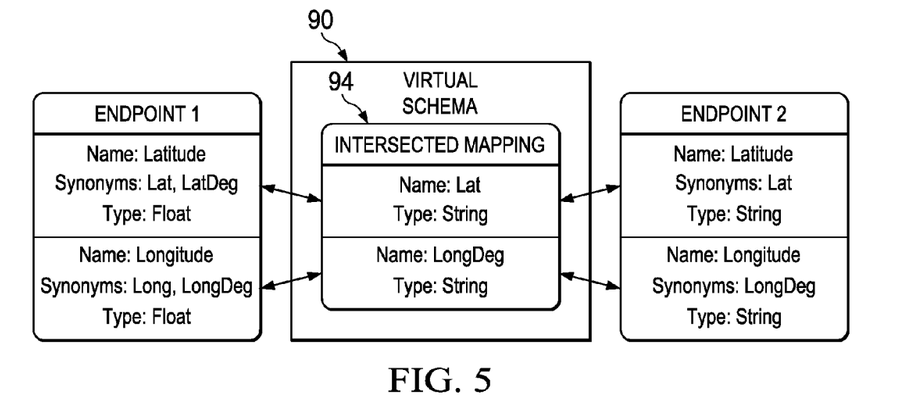
FIG. 5 depicts an intersected mapping of a virtual schema created from an intersection of local schemas from two endpoints.

Referring to FIG. 5, the calculated virtual schema 90 provides an intersected mapping 94 that can be used to tailor the data in a way that the endpoints can both understand. For example, FIG. 5 shows an intersected mapping 94 of a virtual schema calculated from the intersection of longitude and latitude fields in schema definitions supplied by two endpoints. With the intersected mapping, data can be copied from one endpoint to another, while keeping the data intact, without having to restart or otherwise disturb the synchronization engine 70 of the synchronization server 10. Performing the set-intersection to calculate the intersected mapping 94 shown in FIG. 5 may involve the resolution of field names using field synonyms that have been supplied along with the field names; and any data conversions that need to take place will occur on a best-effort basis. For example, the intersected mapping 94 illustrated in FIG. 5 shows that "String" is the canonical mapping type for both the Latitude and Longitude fields, but it is understood that the conversion from "String" to "Float" may fail.

Referring to FIG. 1, each portable wireless device 14, 18, 22, 26 at a respective endpoint 16, 20, 24, 28 includes a synchronization request generator 100, 102, 104, 106. For example, the synchronization request generator 100 within the first portable wireless device 14 is operable to generate a synchronization request that identifies another of the endpoints as a target and which is transmitted to the synchronization server 10. For example, the target endpoint can be the second endpoint 20. The synchronization request detector 78 of the synchronization server 10 detects the synchronization request. The virtual schema generator 76 is operable to generate a virtual schema based on the first local schema 46 and the second local schema 48.

Figure 6:
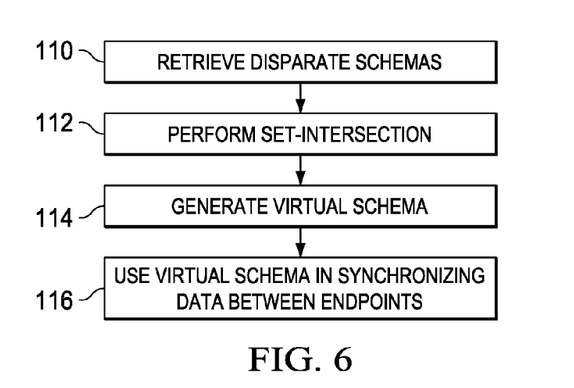
FIG. 6 depicts a method of generating a virtual schema.

An exemplary method of generating a virtual schema in accordance with the principles of the invention is illustrated in FIG. 6. Referring to FIG. 6, disparate local schemas are retrieved from their respective endpoint data stores (110). A set-intersection operation is performed on the local schemas (112) by a set-intersection performer. A virtual schema is generated by the virtual schema generator responsive to the set-intersection operation (114). Some of the fields defined by the local schemas may be similar or related by having similar content or purpose. After the virtual schema is generated, the virtual schema maps content-related field to content-related field (even if they have different names or types). The virtual schema is used in synchronizing data between endpoint data stores (116).

Figure 7:
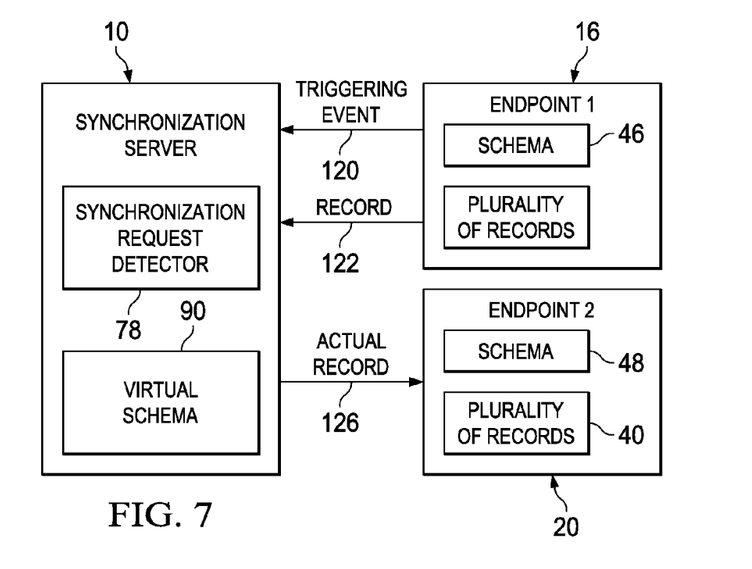
FIG. 7 depicts a synchronization server synchronizing data between endpoints having differing schemas.

FIG. 7 is a schematic view of the synchronization server 10 synchronizing data between endpoints 16, 20 having differing schemas using an already generated virtual schema, such as for example virtual schema 90. Referring to FIG. 7, a synchronization triggering event 120, such as a synchronization request, is detected by the synchronization request detector 78. A record 122, which is ordered according to the first local schema 46 associated with the first endpoint 16, is received from the first endpoint. The received record 122 is processed by the synchronization server 10. Such processing involves tailoring of the record based on the virtual schema 90 to output an actual record 126 that can be used with the different local schema 48 of the second endpoint 20 to update records 40 at the second endpoint. The other endpoint is updated based on the actual record 126 received from the synchronization server.

Figure 8:
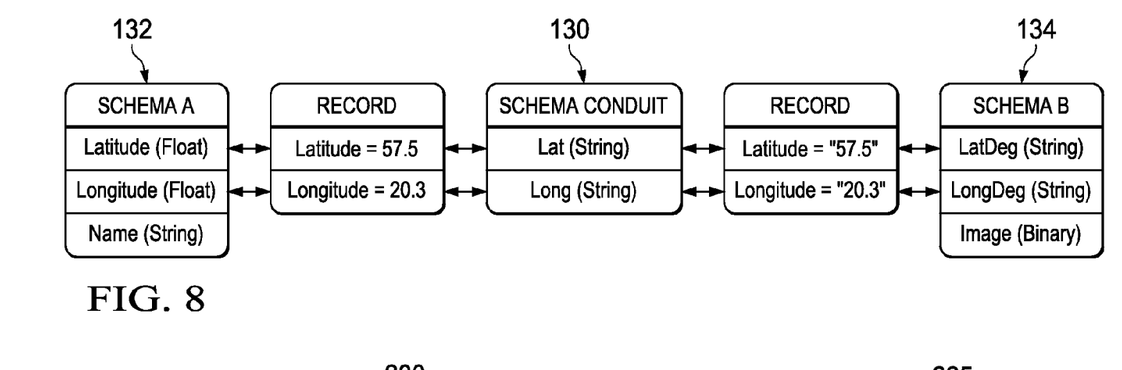
FIG. 8 depicts a virtual schema used as a tailoring and transport mechanism for two local schemas.

Use of a virtual schema as a tailoring and transport mechanism is shown in FIG. 8. Referring to FIG. 8, after the virtual schema has been generated, the virtual schema is used as a schema conduit 130 between the endpoints in order to properly understand and prepare the data being transported between them. For example, GPS information from two disparate databases with differing schemas is synchronized. In the exemplary embodiment illustrated in FIG. 8, a first endpoint has a first schema 132 associated therewith, and a second endpoint has a second schema 134 associated therewith. Referring to FIG. 8, the mapping value for "Latitude" (from Schema A, 132) and "LatDeg" (from Schema B, 134) is "Lat", which is discovered dynamically by intersecting the available synonyms. Similarly the mapping for "Longitude" (from Schema A, 132) and "LongDeg" (from Schema B, 134) is "Long", which is discovered dynamically by intersecting the available synonyms. The actual record data that is transported differs between the endpoints and is enabled by the schema conduit 130 that is created on the fly from the virtual schema.

Figure 9:
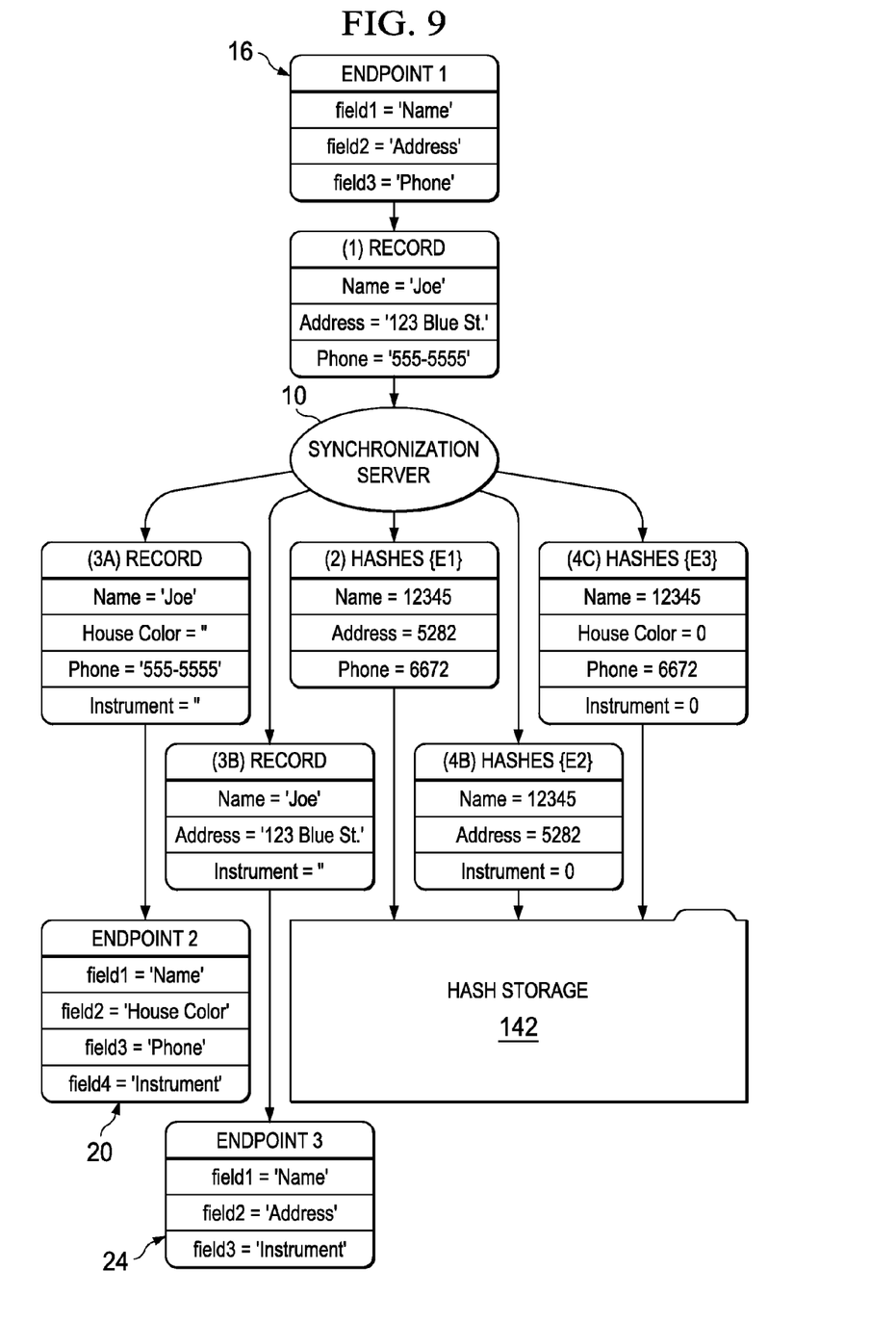
FIG. 9 depicts hashes being managed when synchronizing a single record to multiple endpoints.

In order for all endpoints to be "in sync" for a particular record, we must know the hash value of that record, but that hash value must be with respect to the schemas contained in the other nodes. FIG. 9 depicts how the hashes are managed when synchronizing a single record to multiple endpoints. Referring to FIG. 9, Endpoint 1 (16, FIG. 9) delivers a record to the synchronization server 10 which then tailors that record for Endpoint 2 (20, FIG. 9) and Endpoint 3 (24, FIG. 9) using the virtual schema for both (1,2) and (1,3) respectively. FIG. 9 also depicts a schema at each of Endpoint 1 (16, FIG. 9), Endpoint 2 (20, FIG. 9) and Endpoint 3 (FIG. 9, 24), what the record would look like with respect to those schemas, and the value of the record hash for that record with respect to those schemas. The respective hashes are also stored in the synchronization server's persistent storage medium 140 or hash storage medium 142 for future reference.

Figure 10:
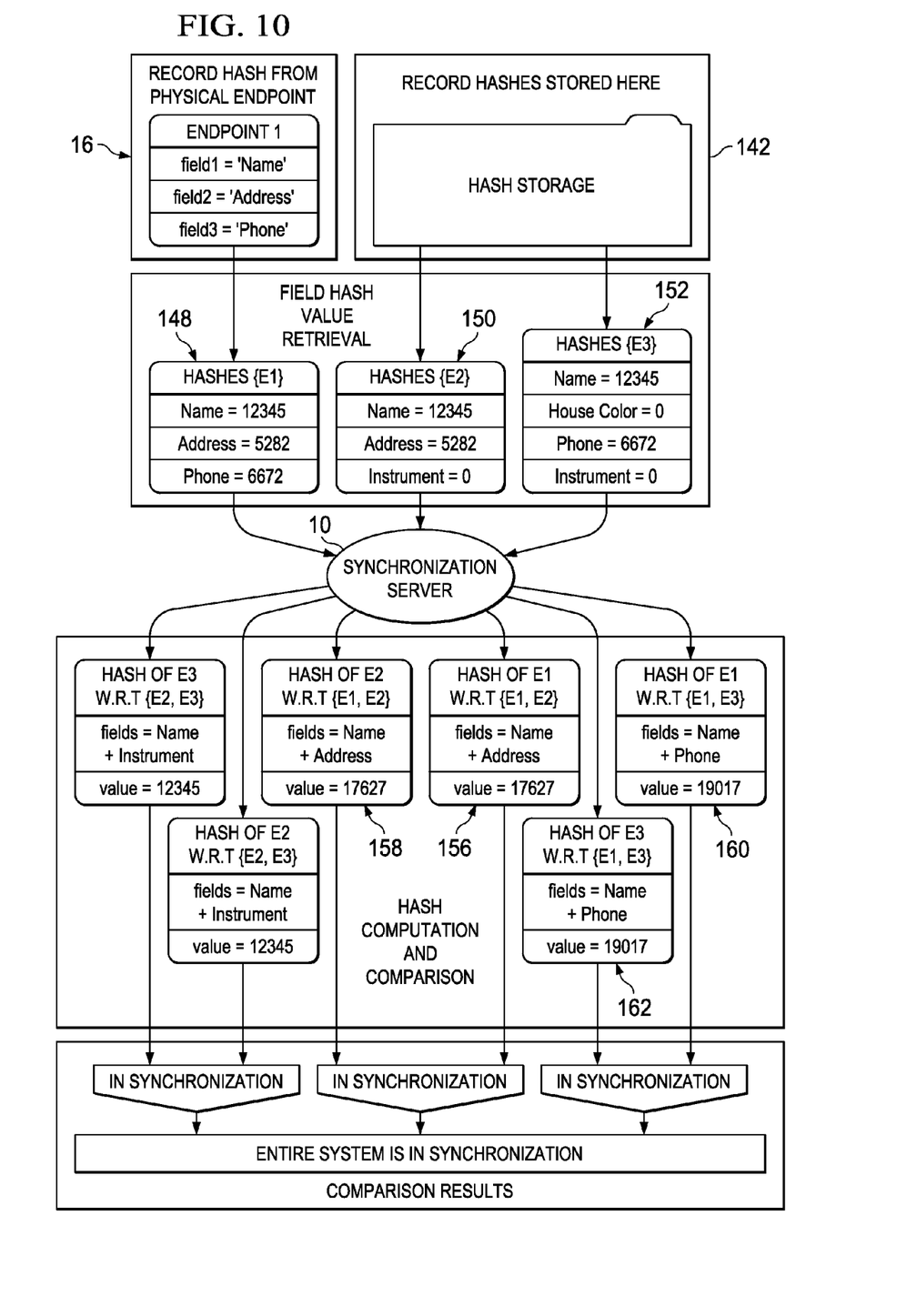
FIG. 10 depicts a mechanism to assess the sync consistency of a given record across all nodes participating in that record's storage using hash computation and comparison.

FIG. 10 depicts a mechanism for assessing the sync consistency of a given record across all nodes participating in that record's storage using hash computation and comparison. Referring to FIG. 10, the hashes 148 for Endpoint 1's representation are depicted as coming directly from Endpoint 1 (16, FIG. 10), and the hashes 150 for Endpoint 2 and the hashes 152 for Endpoint 3 are depicted as coming from the synchronization server's hash storage medium 142, which can be done if it is known that they have not changed.

In order to answer the question of consistency, the hashes are computed with respect to the virtual schema that exists between the endpoints for that record. For example, it is noteworthy that when computing the hash 156 for Endpoint 1 and computing the hash 158 for Endpoint 2 with respect to the virtual schema between Endpoint 1 and Endpoint 2 only the "Name" and the "Address" fields are used. However, when computing the hashes 160, 162 for the exact same record for Endpoint 1 and Endpoint 3 with respect to the virtual schema between Endpoint 1 and Endpoint 3 only the "Name" and "Phone" fields are used. Importantly, all of this computation is done inside the synchronization server 10 independent of any of the endpoints; they are unaware of the other endpoints' participation in the synchronization process in accordance with the principles of the invention.

The synchronization server, portable wireless device and other components described herein may include a processing component that is capable of executing instructions related to the actions described above.

Figure 11:
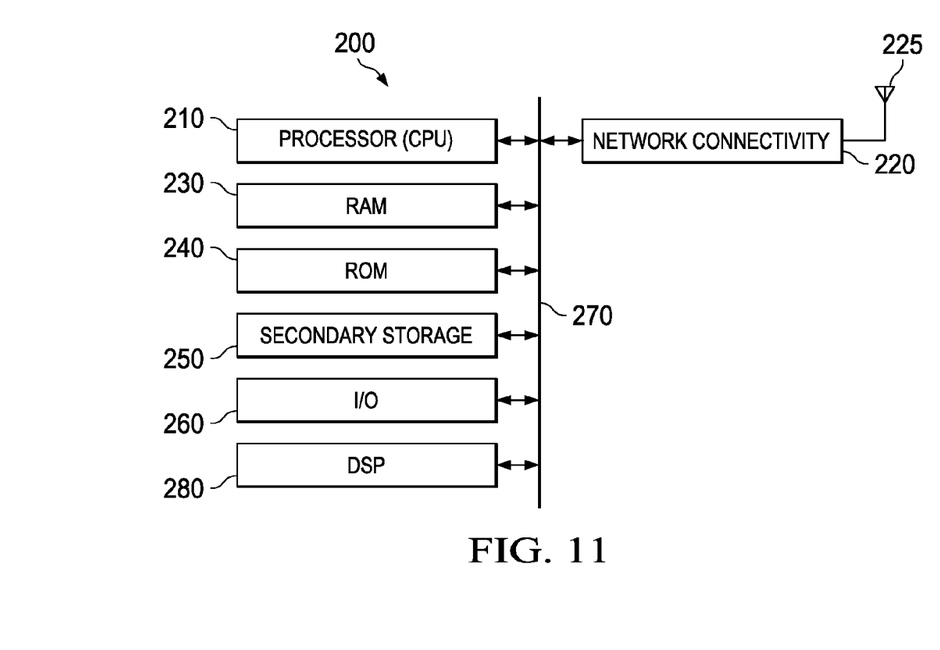
FIG. 11 depicts an exemplary embodiment of an apparatus that may be configured to operate as a synchronization server, portable wireless device, or other type of endpoint computing equipment.

FIG. 11 illustrates an example embodiment of an apparatus 200 that may be configured to operate as or within a synchronization server, portable wireless device, or other type of endpoint computing equipment (e.g., portable wireless devices 14, 18, 22, 26 or synchronization server 10) and which includes a processing component 210 suitable for implementing one or more of the embodiments earlier described herein. In addition to the processor 210 (which may be referred to as a central processor unit or CPU), the apparatus 200 may include network connectivity devices 220, random access memory (RAM) 230, read only memory (ROM) 240, secondary storage 250, and input/output (I/O) devices 260. These components may communicate with one another via a bus 270. In some cases, some of these components may not be present or may be combined in various combinations with one another or with other components not shown. These components may be located in a single physical entity or in more than one physical entity. Any actions described herein as being taken by the processor 210 might be taken by the processor 210 alone or by the processor 210 in conjunction with one or more components shown or not shown in the drawing, such as a digital signal processor (DSP) 280. Although the DSP 280 is shown as a separate component, the DSP 280 may be incorporated into the processor 210.

The processor 210 executes instructions, logic, codes, computer programs, or scripts that it may access from the network connectivity devices 220, RAM 230, ROM 240, or secondary storage 250 (which might include various disk-based systems such as hard disk, floppy disk, or optical disk). In one embodiment, a computer readable medium may store computer readable instructions, which, when executed by the processor 210, cause the processor to perform according to a method described in this disclosure. While only one CPU 210 is shown, multiple processors may be present. Thus, while instructions may be discussed as being executed by a processor, the instructions may be executed simultaneously, serially, or otherwise by one or multiple processors. The processor 210 may, for example, be implemented as one or more CPU chips or modules. The processor 210 may also be integrated with other functions of the synchronization server, portable wireless devices or other types of endpoint computing equipment, in or on a single chip or module.

The network connectivity devices 220 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 220 may enable the processor 210 to communicate with the Internet or one or more telecommunications networks or other networks from which the processor 210 might receive information or to which the processor 210 might output information. The network connectivity devices 220 might also include one or more transceiver components 225 capable of transmitting and/or receiving data wirelessly.

The RAM 230 might be used to store volatile data and perhaps to store instructions that are executed by the processor 210. The ROM 240 is a non-volatile memory device that in some cases has a smaller memory capacity than the memory capacity of the secondary storage 250. ROM 240 might be used to store instructions and perhaps data that are read during execution of the instructions. Access to both RAM 230 and ROM 240 is typically faster than to secondary storage 250. The secondary storage 250 is typically comprised of one or more disk drives or tape drives and might be used for non-volatile storage of data or as an over-flow data storage device if RAM 230 is not large enough to hold all working data. However, the secondary storage 250 could be implemented using any appropriate storage technology, including so-called "solid state disk", FLASH, EEPROM, or other generally non-volatile or persistent storage. Secondary storage 250 may be used to store programs that are loaded into RAM 230 when such programs are selected for execution.

The I/O devices 260 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 225 might be considered to be a component of the I/O devices 260 instead of or in addition to being a component of the network connectivity devices 220.

The present disclosure provides a system and method for seamlessly synchronizing data between two or more endpoint data stores, where the data can be content-related, and the data stores can have disparate schemas. Such system and method are useful for communication device and application users who want to keep content synchronized between all of their devices, possibly but not necessarily tied to a given application, as well as one or more back-end data stores even though the data may be stored according to different schemas on the respective endpoints.

Various processes, structures, components and functions set forth above in detail, associated with one or more system components, servers or devices, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method for synchronizing data between endpoint data stores, comprising:
    performing a set-intersection on a first local schema associated with a first endpoint data store and a second local schema associated with a second endpoint data store, wherein each of the first and second local schemas organizes data into one or more fields of the corresponding first and second endpoint data stores;
    generating a virtual schema based on the set-intersection on the first local schema and the second local schema, wherein the virtual schema maps a field in the first local schema to a field in the second local schema;
    synchronizing data between the first and second endpoint data stores using the virtual schema, the synchronizing comprising:
        receiving, by a synchronization server including a processor, data according to the first local schema from the first endpoint data store, and
        processing, by the synchronization server using the virtual schema, the received data to produce data according to the second local schema for sending over a network to the second endpoint data store;
    computing a hash value of the data according to the first local schema based only on content of at least one field of the data according to the first local schema that is mapped by the virtual schema to at least one field of the second local schema; and
    determining, based on the hash value, a consistency of the data according to the first local schema with the data according to the second local schema.

2. The method of claim 1, further comprising:
    retrieving the first local schema and the second local schema.

3. The method of claim 1, wherein each of the first local schema and the second local schema includes a respective set of field names and data types, and each field name has an associated list of at least one synonym for the field name.

4. The method of claim 1, wherein the synchronizing includes:
    updating the second endpoint data store based on the data according to the second local schema.

5. The method of claim 4, wherein the updating includes:
    transporting the data according to the second local schema to the second endpoint data store.

6. The method of claim 4, wherein the synchronizing is performed responsive to a triggering event.

7. The method of claim 6, wherein the triggering event is a synchronization request sent by a first endpoint that includes the first endpoint data store, the synchronization request identifying a second endpoint that includes the second endpoint data store.

8. The method of claim 1, wherein the performing of the set-intersection includes resolving field names using synonyms.

9. The method of claim 1, wherein the virtual schema is a first virtual schema, the method further comprising:
performing a set-intersection on the first local schema and a third local schema associated with a third endpoint data store, wherein the third local schema organizes data into one or more fields of the third endpoint data store;
generating a second virtual schema different from the first virtual schema, based on the set-intersection on the first local schema and the third local schema, wherein the second virtual schema maps a field in the first local schema to a field in the third local schema; and
synchronizing data between the first and third endpoint data stores using the second virtual schema.

10. The method of claim 1, wherein the one or more fields include one or more sets of field names and data types.

11. A synchronization server for synchronizing data between endpoints, each endpoint having a local schema associated therewith, the synchronization server comprising:
at least one processor configured to:
retrieve the local schema from each respective endpoint, each local schema organizing data into one or more fields of the corresponding endpoint, wherein the one or more fields include one or more pairs of field names and data types,
perform a set-intersection on the local schemas retrieved from the respective endpoints,
generate a virtual schema calculated from the set-intersection, the virtual schema useable in synchronization to tailor the data for transport among the endpoints, the virtual schema mapping a field in a first of the local schemas to a field in a second of the local schemas,
synchronize data between the endpoints using the virtual schema, where the synchronizing comprises:
receiving data according to the first local schema from a first of the endpoints, and
processing, using the virtual schema, the received data to produce data according to the second local schema for sending over a network to a second of the endpoints,
compute a hash value of the data according to the first local schema based only on content of at least one field of the data according to the first local schema that is mapped by the virtual schema to at least one field of the second local schema, and
determine, based on the hash value, a consistency of the data according to the first local schema with the data according to the second local schema.

12. The synchronization server of claim 11, wherein each field name has an associated list of at least one synonym for the field name.

13. The synchronization server of claim 12, wherein the at least one processor is configured to resolve field names using the synonyms.

14. The synchronization server of claim 13, wherein the synchronization server is configured to store the virtual schema, and upon synchronization, retrieve data and process the retrieved data based on the virtual schema.

15. The synchronization server of claim 11, wherein the synchronization server is configured to communicate with a portable wireless device at each endpoint.

16. The synchronization server of claim 11, wherein:
some of the fields of the local schemas are related by having similar content.

17. The synchronization server of claim 11, comprising:
a discoverer configured to retrieve the local schemas from the endpoints.

18. The synchronization server of claim 17, further comprising:
a set-intersection performer configured to perform the set-intersection on the retrieved local schemas.

19. The synchronization server of claim 18, further comprising:
a virtual schema generator configured to generate the virtual schema based on the set-intersection.

20. The synchronization server of claim 19, further comprising:
a synchronization request detector configured to respond to a synchronization request.

21. The synchronization server of claim 11, wherein the synchronization server is communicatively coupled to a plurality of portable wireless devices at respective endpoints.

22. A non-transitory computer-accessible medium storing instructions which, when executed by a processing entity, effectuate synchronization of data between endpoint data stores, the non-transitory computer-accessible medium comprising:
a code portion for performing a set-intersection on a first local schema associated with a first endpoint data store and a second local schema associated with a second endpoint data store, wherein each of the first and second local schemas organizes data into one or more fields of the corresponding first and second endpoint data stores;
a code portion for generating a virtual schema based on the set-intersection on the first local schema and the second local schema, wherein the virtual schema maps a field in the first local schema to a field in the second local schema;
a code portion for synchronizing data between the first and second endpoint data stores using the virtual schema, the synchronizing comprising:
receiving, by a synchronization server, data according to the first local schema from the first endpoint data store, and
processing, by the synchronization server using the virtual schema, the received data to produce data according to the second local schema for sending over a network to the second endpoint data store;
a code portion for computing a hash value of the data according to the first local schema based only on content of at least one field of the data according to the first local schema that is mapped by the virtual schema to at least one field of the second local schema; and
a code portion for determining, based on the hash value, a consistency of the data according to the first local schema with the data according to the second local schema.

23. The non-transitory computer-accessible medium of claim 22, wherein the one or more fields include one or more sets of field names and data types.

* * * * *